C. C. SIMPSON.
Chisels for Stone-Cutting.
No. 165,692.        Patented July 20, 1875.
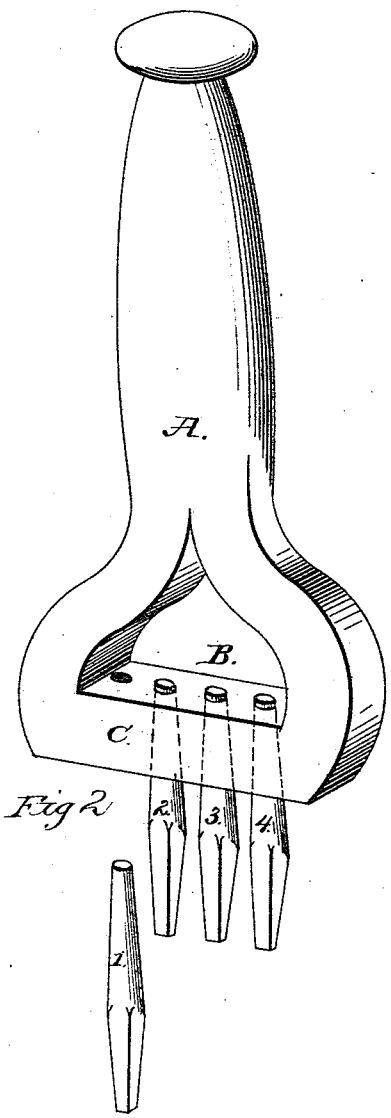

UNITED STATES PATENT OFFICE.

CHARLES C. SIMPSON, OF SANTA CLARA, ASSIGNOR OF ONE-HALF HIS RIGHT TO CHARLES J. MARTIN, OF SAN JOSÉ, CALIFORNIA.

IMPROVEMENT IN CHISELS FOR STONE-CUTTING.

Specification forming part of Letters Patent No. 165,692, dated July 20, 1875; application filed February 3, 1875.

*To all whom it may concern:*

Be it known that I, CHARLES COLEMAN SIMPSON, of the town of Santa Clara, in the county of Santa Clara and State of California, have invented certain Improvements in Toothed Chisels, of which the following is a specification:

The nature of my invention consists of a combination of devices to form a toothed chisel, having detachable teeth for stone-cutting.

Figure 1 is a perspective view of the chisel. Fig. 2 shows one of the teeth detached.

A is the handle, made of cast-steel, or other suitable metal having a triangular perforation, B, formed in the broad or blade end thereof. The lower edge of the blade C is perforated so as to form tapering sockets therein, into which the teeth may be inserted and firmly held. 1 2 3 4 are the teeth, made of properly tempered or hardened steel, which are tapered on one end so as to fit into the sockets in the blade C. The other end is also tapered so as to form thereon a chisel or cutting edge.

To detach one or more of the teeth it is only necessary to insert in the perforation B, and place on the end of the tooth to be detached, any suitable bar or piece of metal, and, by tapping thereon with a hammer, loosen and detach the teeth.

I claim as my invention—

A toothed chisel for stone-cutting, having detachable teeth, substantially as and for the purposes hereinbefore set forth.

C. C. SIMPSON.

Witnesses:
M. J. ASHMORE,
T. B. SMITH.